US 8,320,861 B2

(12) United States Patent
Tong

(10) Patent No.: US 8,320,861 B2
(45) Date of Patent: Nov. 27, 2012

(54) CHANNEL PREDICTION SYSTEM, RADIO COMMUNICATION DEVICE, AND CHANNEL PREDICTION METHOD

(75) Inventor: Fangwei Tong, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 51 days.

(21) Appl. No.: 13/121,678

(22) PCT Filed: Sep. 28, 2009

(86) PCT No.: PCT/JP2009/066804
§ 371 (c)(1),
(2), (4) Date: Mar. 29, 2011

(87) PCT Pub. No.: WO2010/035839
PCT Pub. Date: Apr. 1, 2010

(65) Prior Publication Data
US 2011/0207400 A1    Aug. 25, 2011

(30) Foreign Application Priority Data
Sep. 29, 2008    (JP) .................................. 2008-251944

(51) Int. Cl.
*H04B 1/18*    (2006.01)
(52) U.S. Cl. .................. 455/154.1; 455/131; 455/184.1; 455/231; 370/328; 375/326
(58) Field of Classification Search ............... 455/154.1, 455/131, 184.1, 231, 67.13, 67.11, 63.1, 455/230; 375/326, 344, 231, 195; 370/328, 370/335
See application file for complete search history.

(56) References Cited

U.S. PATENT DOCUMENTS

| 6,088,324 | A   | * | 7/2000  | Sato ............................... 370/203 |
| 7,218,949 | B2  | * | 5/2007  | Koo et al. ...................... 455/522 |
| 8,144,667 | B2  | * | 3/2012  | Dominique et al. .......... 370/335 |
| 8,185,064 | B2  | * | 5/2012  | Nogami et al. ............... 455/102 |
| 2003/0040859 | A1 |   | 2/2003  | Farmer |
| 2004/0067757 | A1 | * | 4/2004  | Fukui ............................ 455/453 |
| 2007/0072610 | A1 | * | 3/2007  | Qiao et al. .................... 455/436 |
| 2007/0286310 | A1 | * | 12/2007 | Fukuoka et al. .............. 375/340 |

(Continued)

FOREIGN PATENT DOCUMENTS

| JP | 2003-267182 A   | 9/2003 |
| WO | 2006/098105 A1  | 9/2006 |

OTHER PUBLICATIONS

Duel-Hallen et al., "Long Range Prediction of Fading Signals: Enabling Adaptive Transmission for Mobile Radio Channels", IEEE Signal Processing Magazine, vol. 17, No. 3, pp. 62-75, May 2000.

(Continued)

*Primary Examiner* — Pablo Tran
(74) *Attorney, Agent, or Firm* — Procopio, Cory Hargreaves & Savitch LLP

(57) ABSTRACT

A channel prediction system (100) is provided with an estimation error calculator (130) which calculates an estimation error value representing the difference between a channel estimation value and a channel characteristic, and a prediction error calculator (140) for calculating a prediction error value indicating the difference between the channel prediction value calculated by a channel prediction unit (120) and a channel characteristic. The channel prediction unit (120) uses the channel prediction with priority over using the channel estimation value to calculate the channel prediction value corresponding to a future time when the estimation error value exceeds the prediction error value.

12 Claims, 4 Drawing Sheets

U.S. PATENT DOCUMENTS

| | | |
|---|---|---|
| 2008/0188184 A1 | 8/2008 | Nogami et al. |
| 2009/0060102 A1* | 3/2009 | Wong et al. .................. 375/345 |
| 2009/0221238 A1* | 9/2009 | Ko et al. .................. 455/67.13 |
| 2010/0167657 A1* | 7/2010 | Molnar et al. ............. 455/67.11 |
| 2012/0014424 A1* | 1/2012 | Heath et al. .................. 375/224 |

OTHER PUBLICATIONS

International Search Report and Written Opinion dated Mar. 9, 2010 issued by the Japanese Patent Office for International Application No. PCT/JP2009/066804.

* cited by examiner

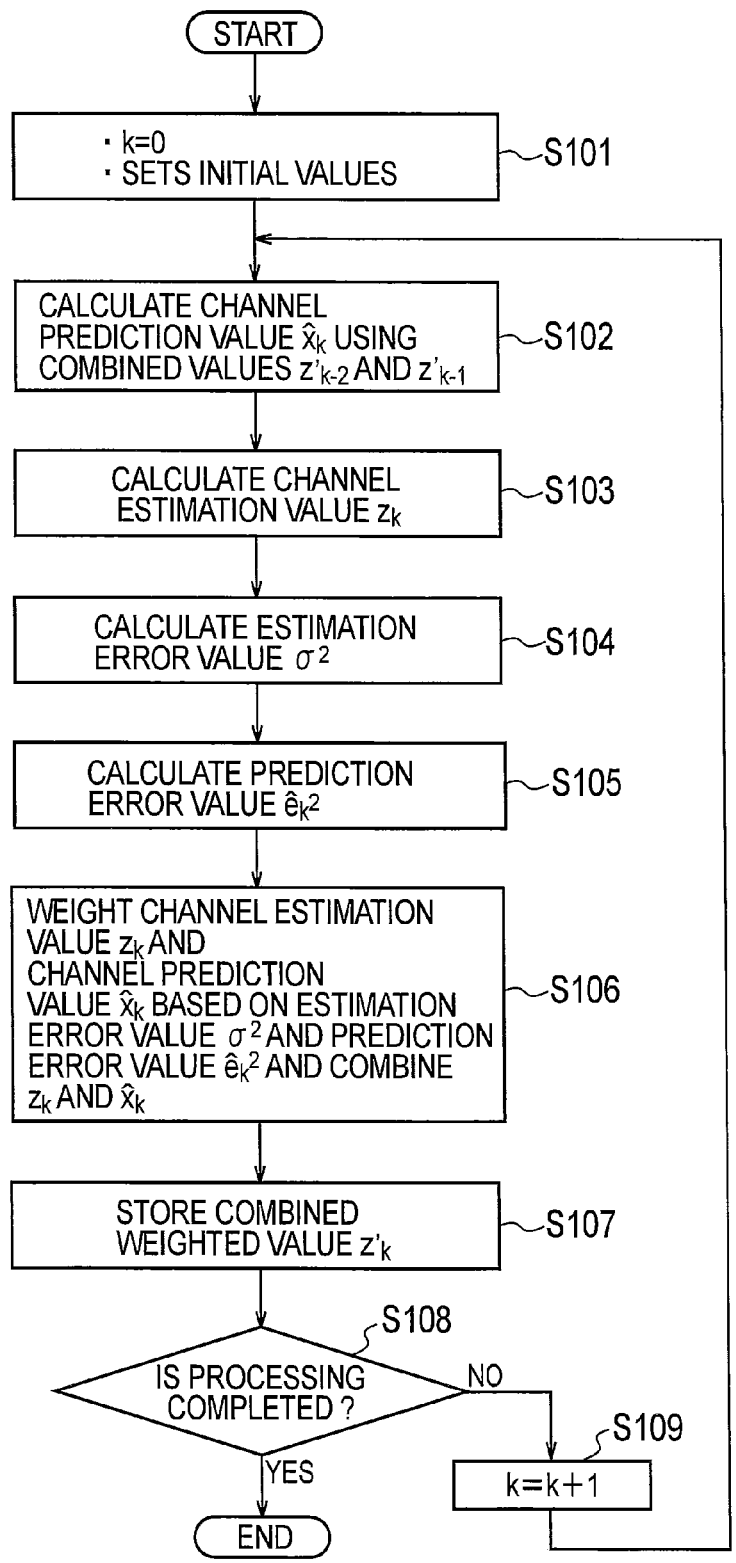

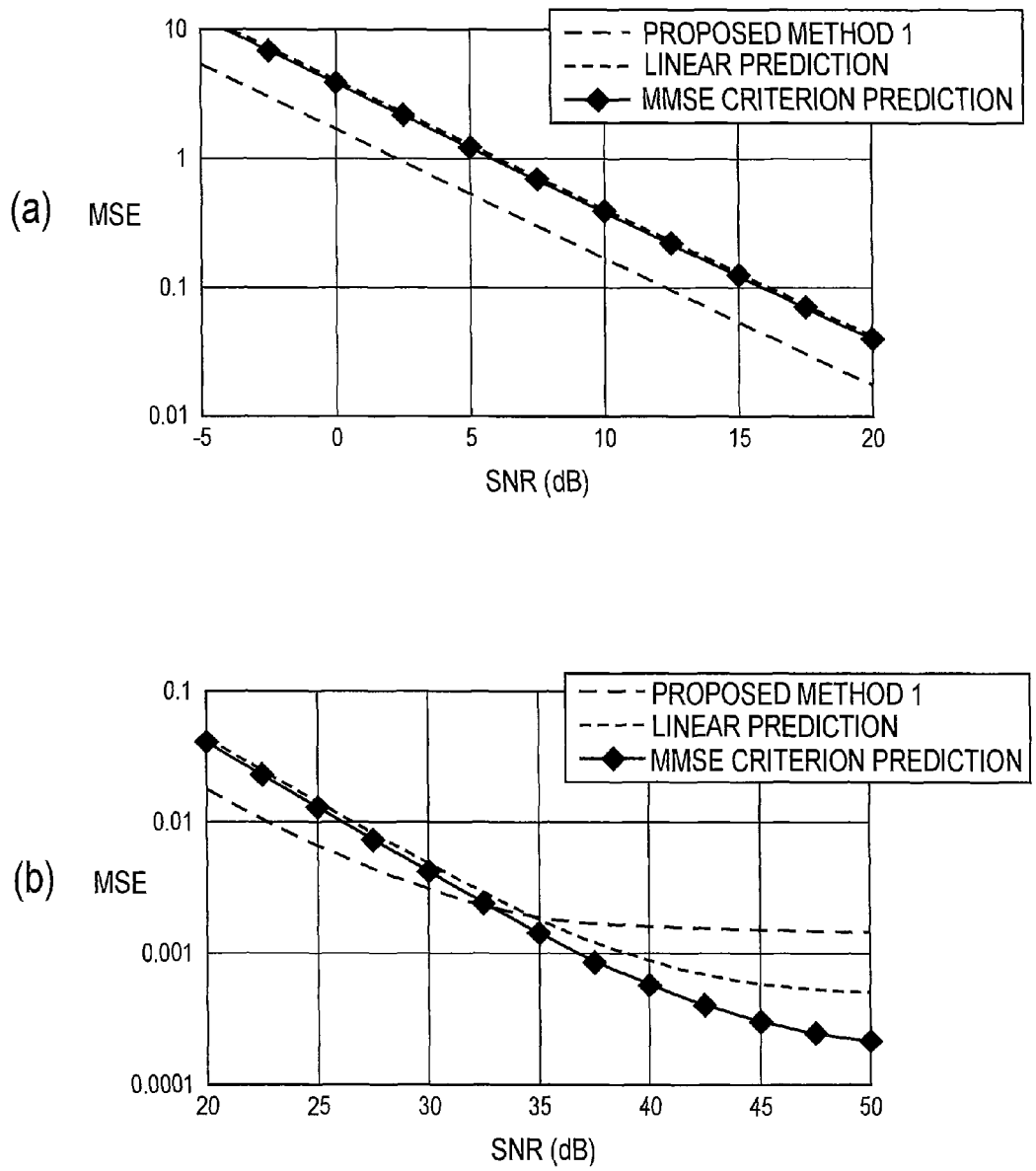

CHANNEL PREDICTION SYSTEM, RADIO COMMUNICATION DEVICE, AND CHANNEL PREDICTION METHOD

TECHNICAL FIELD

The present invention relates to a channel prediction system, a radio communication device, and a channel prediction method for executing channel prediction.

BACKGROUND ART

The state (amplitude, phase, and the like) of a radio signal transmitted and received in a radio communication system changes depending on a characteristic of a radio channel (hereinafter referred to as a channel characteristic). To enable communication control adapting to such changing channel characteristic, channel estimation in which a channel estimation value indicating the channel characteristic between a transmitter side and a receiver side is calculated based on a radio signal received at the receiver side is widely used.

In particular, multi-antenna transmission techniques such as a space-division multiple access (SDMA) and multi-input multi-output (MIMO) communications that use multiple antennas to improve frequency utilization efficiency highly depend on the conditions of the radio channel.

In recent years, provision of channel prediction that is an advanced technique of the channel estimation has been considered for improving the performance of the SDMA and MIMO transmission techniques for a radio channel involving rapid change. Using a channel estimation value at a certain time point, the channel prediction calculates a channel prediction value that is a prediction value of the channel characteristic some time after the certain time point. Specifically, the channel prediction value is calculated from the channel estimation value by a method such as linear prediction and minimum mean square error (MMSE) criterion prediction (for example, Non-Patent Document 1).

CITATION LIST

Non-Patent Document

A. Duel-Hallen, S. Hu and H. Hallen, "Long range prediction of fading signals: Enabling adaptive transmission for mobile radio channels," IEEE Signal Processing Mag., vol. 17, No. 3, pp. 62-75, May 2000.

SUMMARY OF THE INVENTION

However, the above-described channel prediction has the following problem. Specifically, due to influence of noise contained in a radio signal received at the receiver side, a difference (hereinafter referred to as estimation error) occurs between the channel estimation value and the actual channel characteristic. There has been a problem that when the channel prediction is executed using a channel estimation value including such estimation error, the prediction performance of the channel prediction is degraded.

In view of the above, an objective of the present invention is to provide a channel prediction system, a radio communication device, and a channel prediction method that are capable of reducing degradation of prediction performance of channel prediction even when a channel estimation value includes an estimation error.

In order to solve the problems described above, the present invention has the following features. According to a first feature of the present invention, there is provided a channel prediction system (channel prediction system 100) comprising: a channel estimation unit (channel estimation unit 110) configured to calculate a channel estimation value indicating a channel characteristic between a transmitter side (transmitter 10) of a radio signal and a receiver side (receiver 20) of the radio signal, based on the radio signal received by the receiver side; a channel prediction unit (channel prediction unit 120) configured to calculate, using the channel estimation value, a channel prediction value that is a prediction value of the channel characteristic at a time point after a time point at which the channel estimation value is calculated; an estimation error value calculator (estimation error calculator 130) configured to calculate an estimation error value (estimation error value $\sigma^2$) indicating a difference between the channel estimation value (channel estimation value $z_{k-1}$) calculated at a first time point (e.g. time point $t_{k-1}$) by the channel estimation unit and the channel characteristic at the first time point; and a prediction error value calculator (prediction error calculator 140) configured to calculate a prediction error value indicating a difference between the channel prediction value (channel prediction value $\hat{x}_{k-1}$) calculated for the first time point by the channel prediction unit at a second time point (time point $t_{k-2}$) before the first time point and the channel characteristic at the first time point, wherein, when the estimation error value is larger than the prediction error value, the channel prediction unit calculates the channel prediction value (channel prediction value $\hat{x}_k$) for a third time point (e.g. time point $t_k$) after the first time point, preferentially using the channel prediction value calculated for the first time point over the channel estimation value calculated at the first time point.

According to such a feature, when the estimation error value is larger than the prediction error value, the channel prediction unit calculates the channel prediction value for the third time point after the first time point, preferentially using the channel prediction value calculated for the first time point over the channel estimation value calculated at the first time point. Thus, the degradation of the prediction performance of the channel prediction can be reduced even when the channel estimation value includes the estimation error.

A second feature of the present invention is according to the first feature of the present invention and is summarized in that: when the prediction error value is larger than the estimation error value, the channel prediction unit calculates the channel prediction value for the third time point, preferentially using the channel estimation value calculated at the first time point over the channel prediction value calculated for the first time point.

A third feature of the present invention is according to the first feature of the present invention and is summarized in that: when the estimation error value is zero, the channel prediction unit calculates the channel prediction value for the third time point, using only the channel estimation value calculated at the first time point out of the channel estimation value and the channel prediction value calculated for the first time point.

A fourth feature of the present invention is according to the first feature of the present invention and is summarized in that: when the prediction error value is zero, the channel prediction unit calculates the channel prediction value for the third time point, using only the channel prediction value calculated for the first time point out of the channel estimation value calculated at the first time point and the channel prediction value.

A fifth feature of the present invention is according to the first feature of the present invention and is summarized in that the channel predication unit comprises: a weighting and combining unit (weighting and combining unit 121) configured to weight the channel estimation value calculated at the first time point and the channel prediction value calculated for the first time point, in accordance with the estimation error value and the prediction error value, and to combine the weighted channel estimation value and the weighted channel prediction value; and a prediction execution unit (prediction execution unit 123) configured to calculate the channel prediction value for the third time point, using a combined weighted value (combined weighted value $z'_k$) obtained by combining the weighted channel estimation value and the weighted channel prediction value.

A sixth feature of the present invention is according to the fifth feature of the present invention and is summarized in that: the weighting and combining unit decreases a weight for the channel estimation value calculated at the first time point as the estimation error value increases, and the weighting and combining unit decreases a weight for the channel prediction value calculated for the first time point as the prediction error value increases.

A seventh feature of the present invention is according to the fifth feature of the present invention and is summarized in that: the weighting and combining unit calculates the combined weighted value E by any one of a formula: E=D+{B/(A+B)}(C−D), where A is the estimation error value, B is the prediction error value, C is the channel estimation value calculated at the first time point, and D is the channel prediction value calculated for the first time point, and a formula equivalent to the formula.

An eighth feature of the present invention is according to the fifth feature of the present invention and is summarized in that: when the estimation error value is larger than the prediction error value, the channel prediction unit calculates the channel prediction value for the third time point, using only the channel prediction value calculated for the first time point out of the channel estimation value calculated at the first time point and the channel prediction value, and when the prediction error value is larger than the estimation error value, the channel prediction unit calculates the channel prediction value for the third time point, using only the channel estimation value calculated at the first time point out of the channel estimation value and the channel prediction value calculated for the first time point.

A ninth feature of the present invention is according to the first feature of the present invention and is summarized in that: the estimation error value calculator calculates the estimation error value in accordance with a noise level of the radio signal received from the transmitter side at the receiver side.

A tenth feature of the present invention is according to the first feature of the present invention and is summarized in that: the prediction error calculator calculates the prediction error value based on a past error value (error $e_{k-1}$) indicating a difference between the channel estimation value calculated by the channel estimation unit at the second time point and the channel characteristic at the second time point.

According to an eleventh feature of the present invention, there is provided a radio communication device (e.g. receiver 20) comprising: a channel estimation unit (channel estimation unit 110) configured to calculate a channel estimation value indicating a channel characteristic between a transmitter side (transmitter 10) of a radio signal and a receiver side (receiver 20) of the radio signal, based on the radio signal received by the receiver side; a channel prediction unit (channel prediction unit 120) configured to calculate, using the channel estimation value, a channel prediction value that is a prediction value of the channel characteristic at a time point after a time point at which the channel estimation value is calculated; an estimation error value calculator (estimation error calculator 130) configured to calculate an estimation error value (estimation error value $\sigma^2$) indicating a difference between the channel estimation value (channel estimation value $z_{k-1}$) calculated at a first time point (e.g. time point $t_{k-1}$) by the channel estimation unit and the channel characteristic at the first time point; and a prediction error value calculator (prediction error calculator 140) configured to calculate a prediction error value indicating a difference between the channel prediction value calculated for the first time point by the channel prediction unit at a second time point (time point $t_{k-2}$) before the first time point and the channel characteristic at the first time point, wherein, when the estimation error value is larger than the prediction error value, the channel prediction unit calculates the channel prediction value (channel prediction value $x^\wedge_k$) for a third time point (e.g. time point $t_k$) after the first time point, preferentially using the channel prediction value calculated for the first time point over the channel estimation value calculated at the first time point.

According to a twelfth feature of the present invention, there is provided a channel prediction method comprising the steps of: calculating a channel estimation value indicating a channel characteristic between a transmitter side of a radio signal and a receiver side of the radio signal, based on the radio signal received by the receiver side; calculating, using the channel estimation value, a channel prediction value that is a prediction value of the channel characteristic at a time point after a time point at which the channel estimation value is calculated; calculating (step S104) an estimation error value indicating a difference between the channel estimation value calculated at a first time point in the step of calculating a channel estimation value and the channel characteristic at the first time point; and calculating (step S105) a prediction error value indicating a difference between the channel prediction value calculated for the first time point by the channel prediction unit at a second time point before the first time point and the channel characteristic at the first time point, wherein, when the estimation error value is larger than the prediction error value, the step of calculating a channel prediction value includes calculating the channel prediction value for a third time point after the first time point, preferentially using the channel prediction value calculated for the first time point over the channel estimation value calculated at the first time point.

According to the present invention a channel prediction system, a radio communication device, and a channel prediction method can be provided that are capable of reducing the degradation of prediction performance in channel prediction even when a channel estimation value includes an estimation error.

BRIEF DESCRIPTION OF DRAWINGS

FIG. 3 is a flowchart showing operations of a channel prediction system according to the embodiment of the present invention.

FIG. 4 is a diagram showing simulation result of the channel prediction system according to the embodiment of the present invention.

DESCRIPTION OF EMBODIMENTS

Figure 1:
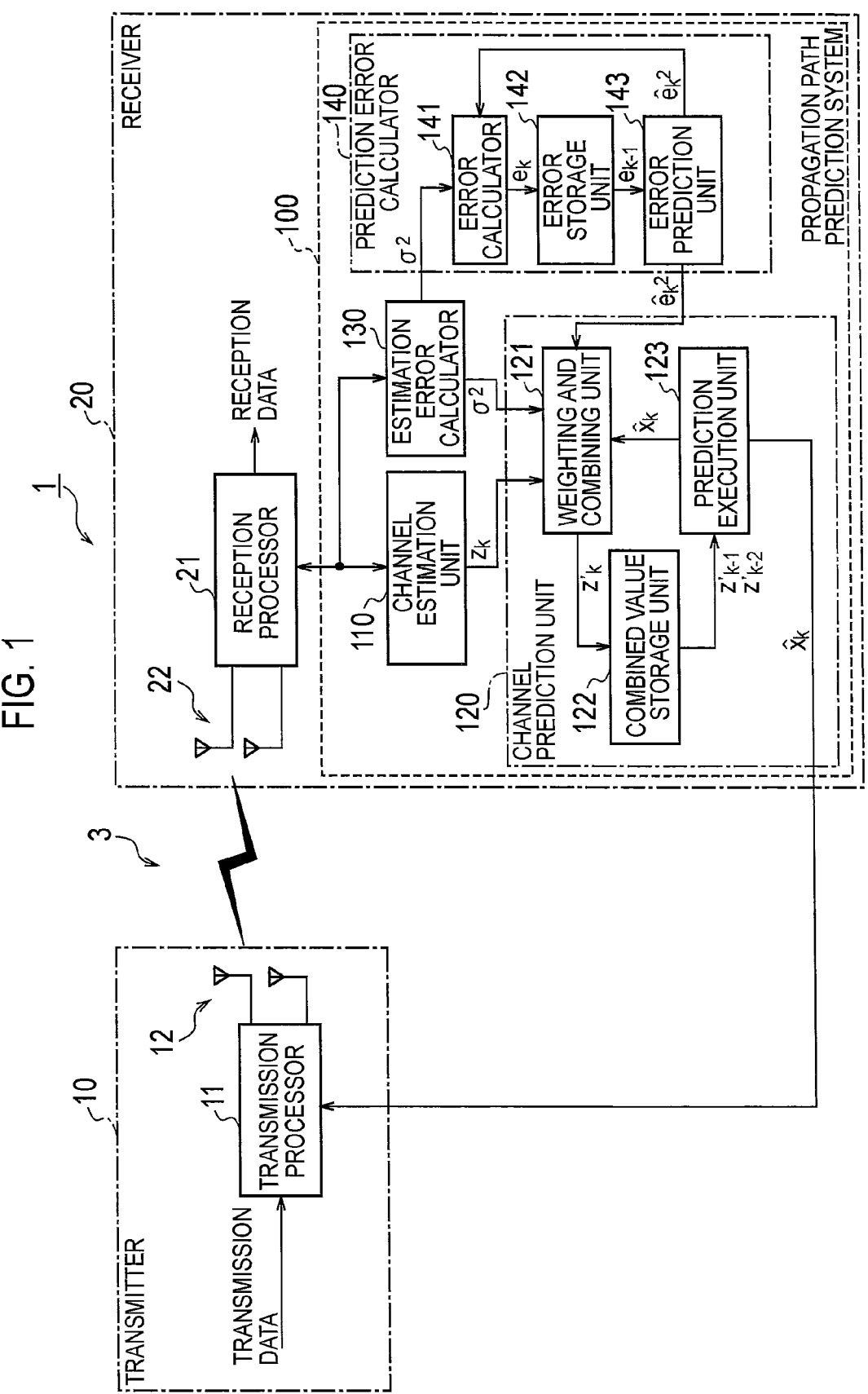
FIG. 1 is a block diagram showing a configuration of a radio communication system according to an embodiment of the present invention.

Next, an embodiment of the present invention will be described with reference to the drawings. Specifically, descriptions will be given of (1) a schematic configuration of a radio communication system, (2) a configuration of a channel prediction system, (3) processing of the channel prediction system, (4) simulation evaluation, (5) advantageous effects, and (6) other embodiments. In the following descriptions of the drawings in the embodiments, the same or similar reference numerals are given to the same or similar parts.

(1) Schematic Configuration of Radio Communication System

FIG. 1 is a block diagram showing a configuration of a radio communication system 1 according to this embodiment.

As shown in FIG. 1, the radio communication system 1 includes a transmitter 10 and a receiver 20. The transmitter 10 serves as a transmitter side of a radio signal and the receiver 20 serves as a receiver side of the radio signal. Specifically, the receiver 20 receives the radio signal transmitted from the transmitter 10 through a radio channel 3. The transmitter 10 is provided at anyone of a radio base station and a radio terminal, and the receiver 20 is provided to the other one of the radio base station and the radio terminal.

The receiver 20 analyzes the radio signal received from the transmitter 10 and feeds back feedback information for adaptively controlling multi-antenna transmission of the transmitter 10 to the transmitter 10. The transmitter 10 includes a transmission processor 11 in addition to transmission antennas 12. The transmission processor 11 executes adaptive communication control (for example, adaptive modulation, transmission power control, transmission weight control, and the like) based on the feedback information fed back from the receiver 20.

The receiver 20 includes a reception processor 21 and a channel prediction system 100 in addition to receiving antennas 22. The reception processor 21 executes reception processing (specifically, equalization detection processing or the like) on a radio signal received by the reception antennas 22. The receiver 20 generates reception data from the received radio signal through the reception processing.

The channel prediction system 100 executes the channel estimation and the channel prediction that are described above. Specifically, the channel prediction system 100 calculates a channel prediction value for a time point ahead for process delay time (i.e., a time point at which the transmitter 10 next transmits a radio signal) and generates a value based on the calculated propagation prediction value as the feedback information.

(2) Configuration of Channel Prediction System

Still referring to FIG. 1, a configuration of the channel prediction system 100 is described.

The channel prediction system 100 includes a channel estimation unit 110, a channel prediction unit 120, an estimation error calculator 130, and a prediction error calculator 140. The channel prediction unit 120 includes a weighting and combining unit 121, a combined value storage unit 122, and a prediction execution unit 123. The prediction error calculator 140 includes an error calculator 141, an error storage unit 142, and an error prediction unit 143.

The channel estimation unit 110 executes the channel estimation. Specifically, the channel estimation unit 110 compares a known signal included in a radio signal and a reference signal stored in advance, and periodically calculates a channel estimation value $z_k$ indicating the channel characteristic of the radio channel 3 based on the result of the comparison. Here, the known signal is a signal sequence of which preset values such as amplitude and phase is known to the transmitter side and the receiver side. The reference signal is a signal sequence equivalent to the known signal.

When a large number of channels exist between the transmitter side and the receiver side, the channel estimation unit 110 executes the estimation for all the channels as needed.

The channel estimation value $z_k$ calculated by the channel estimation unit 110 includes the estimation error due to the effect of the noise included in the radio signal received by the receiver 20. The channel estimation value $z_k$ is supplied to the channel prediction unit 120. The channel estimation value $z_k$ is also supplied to the reception processor 21 and is used in the reception processing such as equalization processing in the reception processor 21.

The channel prediction unit 120 executes the channel prediction using the channel estimation value $z_k$ calculated by the channel estimation unit 110. In this embodiment, the channel prediction unit 120 calculates the channel prediction value from the channel estimation value $z_k$ using linear prediction.

Figure 2:
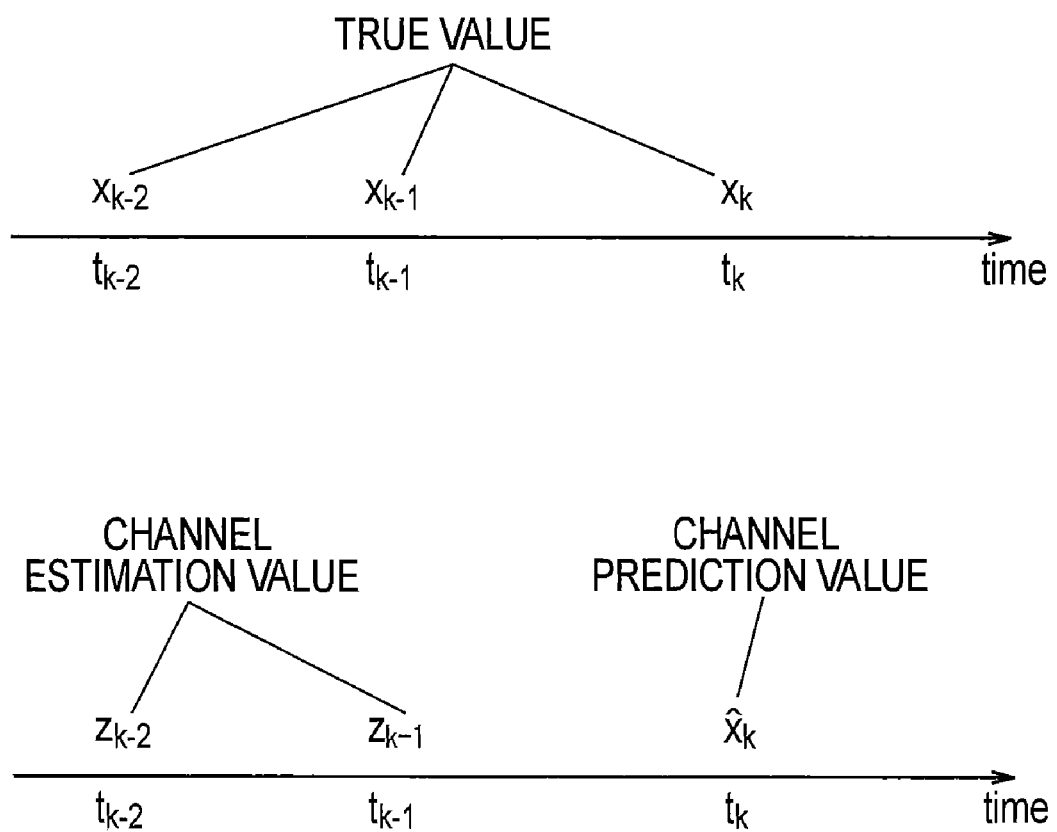
FIG. 2 is a diagram for explaining a general prediction.

As shown in FIG. 2, in general linear prediction, a channel prediction value $\hat{x}_k$ that is a prediction value of a channel characteristic (true value) $x_k$ at a time point $t_k$ using a channel estimation value $z_{k-2}$ calculated at a time point $t_{k-2}$ and a channel estimation value $z_{k-1}$ calculated at a time point $t_{k-1}$. Note that hat ($\hat{\ }$) indicates that the value is a prediction value.

In the general linear prediction, the channel prediction value $\hat{x}_k$ is linearly calculated based on time intervals between the time point $t_k$ and the time point $t_{k-1}$ and between the time point $t_k$ and the time point $t_{k-2}$ as shown in Formula (1).

[Formula 1]

$$\hat{x}_k = \frac{t_k - t_{k-2}}{t_{k-1} - t_{k-2}} z_{k-1} - \frac{t_k - t_{k-1}}{t_{k-1} - t_{k-2}} z_{k-2} \tag{1}$$

In this embodiment, the prediction execution unit 123 of the channel prediction unit 120 obtains the channel prediction value $\hat{x}_k$ by linear prediction from the channel estimation value $z_{k-2}$ and the channel estimation value $z_{k-1}$ in accordance with Formula (2). When a large number of channels exist between the transmitter side and the receiver side, the channel prediction unit 120 executes the prediction for all the channels as needed.

[Formula 2]

$$\hat{x}_k = \frac{t_k - t_{k-2}}{t_{k-1} - t_{k-2}} z'_{k-1} - \frac{t_k - t_{k-1}}{t_{k-1} - t_{k-2}} z'_{k-2} \tag{2}$$

Formula (2) is different from the general linear prediction shown in Formula (1) in that the channel prediction value $z_{k-1}$ and the channel estimation value $z'_{k-2}$ are not directory used. Specifically, in Formula (2), a combined weighted value $z'_{k-1}$ and a combined weighted value $z'_{k-2}$ are respectively used in place of the channel estimation value $z_{k-1}$ and the channel estimation value $z_{k-2}$. This is because the direct use of the channel estimation value $z_{k-1}$ and the channel estimation value $z_{k-2}$, which each include an estimation error, leads to less accurate prediction of the channel characteristic (true value) $x_k$.

The combined weighted value $z'_{k-1}$ and the combined weighted value $z'_{k-2}$ need to be calculated and prepared in advance. Moreover, $z'_{k-1}$ and $z'_{k-2}$ have to be set as initial values at the first calculation point, i.e., point where $t=t_0$. Due to the content of the formula, calculation of $z'_k$ (Formula 3 and Related Formulas 4, 5, and 6) is described instead of calculation of $z'_{k-1}$. $z'_k$ is used at a time point $t=t_k$ to predict a channel at a time point $t=t_{k+1}$.

Here, the combined weighted value $z'_k$ is described. The weighting and combining unit 121 of the channel prediction unit 120 calculates the combined weighted value $z'_k$ by Formula (3) using the channel estimation value $z_k$ and the channel prediction value $\hat{x}_k$ obtained at the time point $t_k$.

$$z'_k = \hat{x}_k + g_k(z_k - \hat{x}_k) \tag{3}$$

The combined weighted value $z'_k$ thus calculated is stored in the combined value storage unit 122. The prediction execution unit 123 uses the combined weighted value $z'_k$ stored in the combined value storage unit 122 for calculating the channel prediction value $\hat{x}_{k+1}$ at the time point $t_{k+1}$ ahead of the time point $t_k$.

$g_k$ in Formula (3) is referred to as an adjustment gain and is a weight coefficient for reducing the effect of noise. The adjustment gain $g_k$ is defined by Formula (4).

[Formula 4]

$$g_k = \frac{\hat{e}_k^2}{\hat{e}_k^2 + \sigma^2} \tag{4}$$

$\hat{e}_k^2$, referred to as a prediction error value below, in Formula (4) is an approximate value of the difference between the channel prediction value $\hat{x}_k$ calculated by the prediction execution unit 123 and the channel characteristic (true value) $x_k$. The prediction error value $\hat{e}_k^2$ is calculated by the prediction error calculator 140.

$\sigma^2$, referred to as an estimation error value below, in Formula (4) is a level of difference (estimation error) between the channel estimation value $z_k$ calculated by the channel estimation unit 110 and the channel characteristic (true value) $x_k$. The estimation error value $\sigma^2$ is calculated by the estimation error calculator 130.

When the estimation error value $\sigma^2$ is zero, i.e., when there is no estimation error, that is, when channel estimation value $z_k$=the channel characteristic (true value) $x_k$, the channel estimation value $z_k$ is highly reliable. Thus, the channel estimation value $z_k$ is preferably used as the combined weighted value $z'_k$ directly. Thus, when the estimation error value $\sigma^2=0$, the adjustment gain $g_k$ is 1 in Formula (4), whereby the combined weighted value $z'_k$=the channel prediction value $z_k$ in Formula (3).

On the other hand, when the estimation error value $\sigma^2>0$, the estimation error is included in the channel estimation value $z_k$. Thus, the channel estimation value $z_k$ is used after being weighted with a value smaller than 1. Thus, when the estimation error value $\sigma^2>0$, the adjustment gain $g_k<1$.

The prediction error value $\hat{e}_k^2$ can be described in the same manner. When the prediction error value $\hat{e}_k^2$ is zero, there is no prediction error. Thus, the channel prediction value $\hat{x}_k$ is highly reliable. Accordingly, the channel prediction value $\hat{x}_k$ is preferably used. Thus, when the prediction error value $\hat{e}_k^2=0$, the adjustment gain $g_k$ is 0 in Formula (4), whereby the combined weighted value $z'_k$=the channel prediction value $\hat{x}_k$ in Formula (3).

On the other hand, when the prediction error value $\hat{e}_k^2>0$, the channel prediction value $\hat{x}_k$ is not used directly and is used after being weighted with a value smaller than 1. Thus, when the prediction error value $\hat{e}_k^2>0$, the adjustment gain $g_k<1$.

As described above, more reliable one of the channel estimation value $z_k$ and the channel prediction value $\hat{x}_k$ determined based on the estimation error value $\sigma^2$ and the prediction error value $\hat{e}_k^2$ is weighted with a larger value and used more preferentially.

Specifically, the propagation prediction unit 120 calculates the channel prediction value $\hat{x}_{k+1}$ using the channel prediction value $\hat{x}_k$ preferentially over the channel estimation value $z_k$ when the estimation error value $\sigma^2$ is larger than the prediction error value $\hat{e}_k^2$. Thus, effect of the noise on the channel estimation value $z_k$ is reduced and the prediction performance is improved. On the other hand, the propagation prediction unit 120 calculates the channel prediction value $\hat{x}_{k+1}$ using the channel estimation value $z_k$ preferentially over the channel prediction value $\hat{x}_k$ when the prediction error value $\hat{e}_k^2$ is larger than the estimation error value $\sigma^2$.

Next, calculation methods for the estimation error value $\sigma^2$ and the prediction error value $\hat{e}_k^2$ are described.

The estimation error value $\sigma^2=E[(z_k-x_k)]^2$ and thus can be regarded as the level of noise included in the true value and its interference level. This can be regarded as a known parameter in communication systems in general. The $\sigma^2$ can be estimated by correlated calculation using a known signal included in a received signal and the like.

The prediction error calculator 140 obtains the prediction error value $\hat{e}_k^2$ by calculating $\hat{e}_k$ in accordance with Formula (5) and then taking the square root thereof.

[Formula 5]

$$\hat{e}_k = \frac{t_k - t_{k-2}}{t_{k-1} - t_{k-2}} e_{k-1} \tag{5}$$

An error $e_{k-1}$ in FIG. 5 can be regarded as the error between the channel estimation value $z_{k-1}$ and the channel characteristic (true value) $x_{k-1}$ at the time point $t_{k-1}$. An approximate prediction error at the time point $t_k$ can be obtained by multiplying the error $e_{k-1}$ at the time point $t_{k-1}$ by $(t_k-t_{k-2})/(t_{k-1}-t_{k-2})$.

The error calculator 141 of the prediction error calculator 140 calculates an error $e_k^2$ from the estimation error value $\sigma^2$ and the prediction error value $\hat{e}_k^2$ using Formula (6). $e_k^2$ is used for calculating $\hat{e}_{k+1}^2$.

[Formula 6]

$$e_k^2 = \frac{\sigma^2}{\hat{e}_k^2 + \sigma^2} \hat{e}_k^2 \tag{6}$$

The error $e_k$ calculated by the error calculator 141 is stored in the error storage unit 142 and is used by the error prediction unit 143.

(3) Processing of Channel Prediction System

Next, processing of the channel prediction system 100 is described. FIG. 3 is a flowchart showing the processing of the channel prediction system 100.

In Step S101, when $t_0$ (k=0) is the first reception time point, the channel prediction system 100 initializes k like k=0, and sets initial values for the combined weighted value $z'_{k-1}$, the combined weighted value $z'_{k-2}$, and the like. Initial values of $z'_{-2}$, $z'_{-1}$, $\hat{e}_0^2$, and $\hat{e}_1^2$ at a time point of k=0 are set as described below.

[Formula 7]

$$z'_{-2} = z'_{-1} = 0 \qquad (7)$$

$$\hat{e}_0^2 = 1, \ e_1^2 = e_0^2 \qquad (8)$$

In Step S102, the prediction execution unit 123 obtains the channel prediction value $\hat{x}_k$ with linear prediction based on Formula (2) using the combined value $z'_{k-2}$ and the combined value $z'_{k-1}$.

In Step 103, the channel estimation unit 110 calculates the channel estimation value $z_k$ with the channel estimation.

In Step S104, the estimation error calculator 130 calculates the estimation error value $\sigma^2$ from the noise level of the radio signal. Since $\sigma^2$ does not change frequently in a general communication system, the calculation may be performed at every predetermined period of time (for example, about every 0.5 second to few seconds).

In Step S105, the prediction error calculator 140 obtains the prediction error value $\hat{e}_k^2$ in accordance with Formulas (5) and (7).

In step S106, the weighing combining unit 121 of the channel prediction unit 120 calculates the combined weighted value $z'_k$ from Formula (3) using the channel estimation value $z_k$ calculated by the channel estimation unit 110 and the channel prediction value $\hat{x}_k$ calculated by the prediction execution unit 123.

In Step S107, the combined value storage unit 122 of the channel prediction unit 120 stores therein the combined weighted value $z'_k$ calculated by the weighting and combining unit 121.

In Step S108 the channel prediction system 100 determines whether or not to terminate the processing or not. When the processing is to be continued, the k representing the time is increased by 1 and the processing returns to Step S102.

(4) Simulation Evaluation

Next, results of simulation evaluation are described to clearly show the effect provided by the present embodiment.

In the simulation, the channel prediction is performed on an I component of fading variation of Doppler frequency: 100 Hz (movement speed of 54 km/h with the frequency of 2 GHz).

Simulation Specifications:
fading variation: 100 Hz Rayleigh flat fading (I component)
$t_k = 478k$ (µs) (k=0, 1, 2, . . . )

For the convenience of simulation, the estimation error is defined as a noise in level SNR (dB) with respect to an average signal power. In other words, estimation value of a channel is defined as a value obtained by superimposing the noise in level SNR (dB) with respect to the average signal power to a true value of the channel.

Results of simulation of square error versus SNR performance regarding the predicted value versus true propagation value. As shown in FIG. 4(*a*), improvement of about 3 dB is obtained by the present embodiment (proposed method 1) compared with the general linear prediction and the MMSE criterion prediction. As shown in FIG. 4(*b*), the characteristic of the MMSE criterion prediction becomes better in the case where noise is small (for example, SNR>35 dB). Still, generally SNR<30 db, and thus the present embodiment can be considered to be more advantageous.

The MMSE criterion prediction is an optimum prediction but does not have noise reducing function unlike the present embodiment, and thus may not be optimum if an estimation error is included in the channel estimation value. The MMSE criterion prediction has further disadvantages such as a large calculation amount, and the need for a correlation value of channels at the estimation point and a prediction point.

The conventional linear prediction can be processed quite easily but its performance cannot be relied upon if the estimation error is included in the channel estimation value.

Methods for executing the channel prediction using various parameters of a wavelet (for example, an arrival direction, Doppler frequency, amplitude, and the like) are also proposed. However, such methods include a problem in estimation accuracy due to the effect of noise and the like as well as a problem in the resolution of parameter estimation. Thus, effectiveness of the prediction methods using the parameters of a channel is questionable. Moreover, complex calculation is required.

On the other hand, the present embodiment does not use the parameters of the wavelet, and thus calculation is simple and can be implemented easily. Furthermore, the present embodiment does not use correlation between the channels at the estimation point and the prediction point, and thus can be used in a case where statistical characteristics cannot be obtained. Moreover, implementation cost of the present embodiment is low because the implementation is easy, and the power consumption in the case of the present embodiment is low because the calculation is simple.

(5) Advantageous Effects

For the convenience of explanation, unlike the formulas, calculation of a channel prediction value $\hat{x}_{k+1}$ corresponding to $t_{k+1}$ is described below. In this embodiment, when the estimation error value $\sigma^2$ is larger than the prediction error value $\hat{e}_k^2$, the channel prediction unit 120 calculates the channel prediction value $\hat{x}_{k+1}$ corresponding to time point $t_{k+1}$ ahead of the time point $t_k$ by preferentially using the channel prediction value $\hat{x}_k$ calculated for the time point $t_k$ over the channel estimation value $z_k$ calculated at the time point $t_k$. Thus, the prediction performance of the channel prediction can be prevented from degrading even when an estimation error is included in the channel estimation value $z_k$.

In this embodiment, the channel prediction unit 120 calculates the channel prediction value $\hat{x}_{k+1}$ by preferentially using the channel estimation value $z_k$ over the channel prediction value $\hat{x}_k$ when the prediction error value $\hat{e}_k^2$ is larger than the estimation error value $\sigma^2$. Thus, the prediction performance of the channel prediction can be prevented from degrading even when a prediction error is included in the channel prediction value $\hat{x}_k$.

In this embodiment, the channel prediction unit 120 calculates the channel prediction value $\hat{x}_{k+1}$ by using only the channel estimation value $z_k$ out of the channel estimation value $z_k$ and the channel prediction value $\hat{x}_k$ when the estimation error value $\sigma^2$ is zero. Thus, channel prediction using the extremely highly reliable channel estimation value $z_k$ can be performed, whereby the prediction performance improves even more.

In this embodiment, the channel prediction unit 120 calculates the channel prediction value $\hat{x}_{k+1}$ by using only the channel prediction value $\hat{x}_k$ out of the channel estimation value $z_k$ and the channel prediction value $\hat{x}_k$ when the prediction error value $\hat{e}_k^2$ is zero. Thus, channel prediction using the extremely highly reliable channel prediction value $\hat{x}_k$ can be performed, whereby the prediction performance improves even more.

In this embodiment, the channel prediction unit 120 includes the weighting and combining unit 121 configured to weight the channel estimation value $z_k$ and the channel prediction value $\hat{x}_k$ based on the estimation error value $\sigma^2$ and the prediction error value $\hat{e}_k^2$ and then combines the weighted channel estimation value $z_k$ and the weighted channel prediction value $\hat{x}_k$, and the prediction executing unit 123 configured to calculate the channel prediction value $\hat{x}_{k+1}$ using the combined weighted value $z'_k$ obtained by combining the weighted channel estimation value $z_k$ and the weighted channel prediction value $\hat{x}_k$.

The weighting and combining unit 121 decreases a weight for the channel estimation value $z_k$ as the estimation error value $\sigma^2$ increases and decreases a weight for the channel prediction value $\hat{x}_k$ as the prediction error value $\hat{e}_k^2$ increases. Thus, more reliable one of the channel estimation value $z_k$ and the channel prediction value $\hat{x}_k$ can be weighted with a larger value and used more preferentially.

In this embodiment, the weighting and combing unit 121 calculates the combined weighted value E by the formula $E=D+\{B/(A+B)\}(C-D)$, where A is the estimation error value, B is the prediction error value, C is the channel estimation value calculated at the first time point, and D is the channel prediction value calculated at the first time point. Alternatively, an equivalent formula obtained by modifying this formula can be used. With such formulas, the combined weighted value can be accurately calculated.

In this embodiment, the estimation error calculator 130 calculates the estimation error value $\sigma^2$ from the noise level of a radio signal received by the receiver 20 from the transmitter 10. Thus, the estimation error value $\sigma^2$ matching the state of the radio channel 3 can be accurately calculated.

In this embodiment, the prediction error calculator 140 calculates the prediction error value $\hat{e}_k^2$ based on a past error value (error $e_{k-1}$) indicating the difference between the channel estimation value $z_{k-1}$ corresponding to the time point $t_{k-1}$ and the channel characteristic $x_{k-1}$ (true value) at the time point $t_{k-1}$. Thus, the prediction error value $\hat{e}_k^2$ can be accurately calculated.

(6) Other Embodiments

Although the present invention has been described through the embodiment as described above, it should not be construed that the descriptions and drawings constituting a part of this disclosure will limit the present invention. Various alternative embodiments, examples, and operation techniques will be apparent to those skilled in the art from this disclosure.

For example, in the above described embodiment, the channel prediction unit 120 calculates the channel prediction value $\hat{x}_{k+1}$ using the combined weighted value $z'_k$. However, the present invention is not limited to such weighting and combining and the configuration can be such that one of the channel estimation value $z_k$ and the channel prediction value $\hat{x}_k$ is simply chosen. In such a configuration, when the estimation error value $\sigma^2$ is larger than the prediction error value $\hat{e}_k^2$, the channel prediction unit 120 calculates the channel prediction value $\hat{x}_{k+1}$ using only the channel prediction value $\hat{x}_k$ out of the channel estimation value $z_k$ and the channel prediction value $\hat{x}_k$. When the prediction error value $\hat{e}_k^2$ is larger than the estimation error value $\sigma^2$, the channel prediction unit 120 calculates the channel prediction value $\hat{x}_{k+1}$ using only the channel estimation value $z_k$ out of the channel estimation value $z_k$ and the channel prediction value $\hat{x}_k$.

In the above-described embodiment, the channel prediction value $\hat{x}_k$ is calculated using Formula (2). However, Formula (2) may be modified.

In the above-described embodiments, the channel prediction system 100 is provided to the receiver 20. However, at least a part (the channel prediction unit 120 and the like, for example) of the channel prediction system 100 may be provided to the transmitter 10.

In the above-described embodiment, description is given on a closed-loop multi antenna transmission system. However, the present invention can be applied to an open-loop multi antenna transmission system using no feedback. In the above-described embodiment, both the transmitter 10 and the receiver 20 include multiple antennas. However, the present invention can be applied to a multiple input single output (MISO) communication system in which the receiver 20 includes only a single antenna, also to a single input multiple output (SIMO) communication system in which the transmitter includes only a single antenna or the like.

As described above, it should be understood that the present invention includes various embodiments or the like which have not been described herein. Therefore, the present invention is limited only by specific features of the invention in the claims which are reasonable from the disclosure.

Note that the entire content of Japanese Patent Application No. 2008-251944 (filed on Sep. 29, 2008) is incorporated herein by reference.

Industrial Applicability

As described above, the channel prediction system, the radio communication device, and the channel prediction method of the present invention can reduce the degradation of the prediction performance of the channel prediction even when the estimation error is included in the channel estimation value, and thus are useful in the field of radio communications such as mobile communications.

The invention claimed is:

1. A channel prediction system comprising:
    a channel estimation unit configured to calculate a channel estimation value indicating a channel characteristic between a transmitter side of a radio signal and a receiver side of the radio signal, based on the radio signal received by the receiver side;
    a channel prediction unit configured to calculate, using the channel estimation value, a channel prediction value that is a prediction value of the channel characteristic at a time point after a time point at which the channel estimation value is calculated;
    an estimation error value calculator configured to calculate an estimation error value indicating a difference between the channel estimation value calculated at a first time point by the channel estimation unit and the channel characteristic at the first time point; and
    a prediction error value calculator configured to calculate a prediction error value indicating a difference between the channel prediction value calculated for the first time point by the channel prediction unit at a second time point before the first time point and the channel characteristic at the first time point, wherein
    when the estimation error value is larger than the prediction error value, the channel prediction unit calculates the channel prediction value for a third time point after the first time point, preferentially using the channel prediction value calculated for the first time point over the channel estimation value calculated at the first time point.

2. The channel prediction system according to claim 1, wherein
    when the prediction error value is larger than the estimation error value, the channel prediction unit calculates the channel prediction value for the third time point, preferentially using the channel estimation value calculated at the first time point over the channel prediction value calculated for the first time point.

3. The channel prediction system according to claim 1, wherein
    when the estimation error value is zero, the channel prediction unit calculates the channel prediction value for the third time point, using only the channel estimation value calculated at the first time point out of the channel estimation value and the channel prediction value calculated for the first time point.

4. The channel prediction system according to claim 1, wherein
when the prediction error value is zero, the channel prediction unit calculates the channel prediction value for the third time point, using only the channel prediction value calculated for the first time point out of the channel estimation value calculated at the first time point and the channel prediction value.

5. The channel prediction system according to claim 1, wherein
the channel prediction unit comprises:
a weighting and combining unit configured to weight the channel estimation value calculated at the first time point and the channel prediction value calculated for the first time point, in accordance with the estimation error value and the prediction error value, and to combine the weighted channel estimation value and the weighted channel prediction value; and
a prediction execution unit configured to calculate the channel prediction value for the third time point, using a combined weighted value obtained by combining the weighted channel estimation value and the weighted channel prediction value.

6. The channel prediction system according to claim 5, wherein
the weighting and combining unit decreases a weight for the channel estimation value calculated at the first time point as the estimation error value increases, and
the weighting and combining unit decreases a weight for the channel prediction value calculated for the first time point as the prediction error value increases.

7. The channel prediction system according to claim 5, wherein
the weighting and combining unit calculates the combined weighted value E by any one of a formula: $E = D + \{B/(A+B)\}(C-D)$, where A is the estimation error value, B is the prediction error value, C is the channel estimation value calculated at the first time point, and D is the channel prediction value calculated for the first time point, and
a formula equivalent to the formula.

8. The channel prediction system according to claim 1, wherein
when the estimation error value is larger than the prediction error value, the channel prediction unit calculates the channel prediction value for the third time point, using only the channel prediction value calculated for the first time point out of the channel estimation value calculated at the first time point and the channel prediction value, and
when the prediction error value is larger than the estimation error value, the channel prediction unit calculates the channel prediction value for the third time point, using only the channel estimation value calculated at the first time point out of the channel estimation value and the channel prediction value calculated for the first time point.

9. The channel prediction system according to claim 1, wherein
the estimation error value calculator calculates the estimation error value in accordance with a noise level of the radio signal received from the transmitter side at the receiver side.

10. The channel prediction system according to claim 1, wherein
the prediction error value calculator calculates the prediction error value based on a past error value indicating a difference between the channel estimation value calculated by the channel estimation unit at the second time point and the channel characteristic at the second time point.

11. A radio communication device comprising:
a channel estimation unit configured to calculate a channel estimation value indicating a channel characteristic between a transmitter side of a radio signal and a receiver side of the radio signal, based on the radio signal received by the receiver side;
a channel prediction unit configured to calculate, using the channel estimation value, a channel prediction value that is a prediction value of the channel characteristic at a time point after a time point at which the channel estimation value is calculated;
an estimation error value calculator configured to calculate an estimation error value indicating a difference between the channel estimation value calculated at a first time point by the channel estimation unit and the channel characteristic at the first time point; and
a prediction error value calculator configured to calculate a prediction error value indicating a difference between the channel prediction value calculated for the first time point by the channel prediction unit at a second time point before the first time point and the channel characteristic at the first time point, wherein
when the estimation error value is larger than the prediction error value, the channel prediction unit calculates the channel prediction value for a third time point after the first time point, preferentially using the channel prediction value calculated for the first time point over the channel estimation value calculated at the first time point.

12. A channel prediction method comprising the steps of:
calculating a channel estimation value indicating a channel characteristic between a transmitter side of a radio signal and a receiver side of the radio signal, based on the radio signal received by the receiver side;
calculating, using the channel estimation value, a channel prediction value that is a prediction value of the channel characteristic at a time point after a time point at which the channel estimation value is calculated;
calculating an estimation error value indicating a difference between the channel estimation value calculated at a first time point in the step of calculating a channel estimation value and the channel characteristic at the first time point; and
calculating a prediction error value indicating a difference between the channel prediction value calculated for the first time point by the channel prediction unit at a second time point before the first time point and the channel characteristic at the first time point, wherein
when the estimation error value is larger than the prediction error value, the step of calculating a channel prediction value includes calculating the channel prediction value for a third time point after the first time point, preferentially using the channel prediction value calculated for the first time point over the channel estimation value calculated at the first time point.

* * * * *